United States Patent Office 3,276,358
Patented Oct. 4, 1966

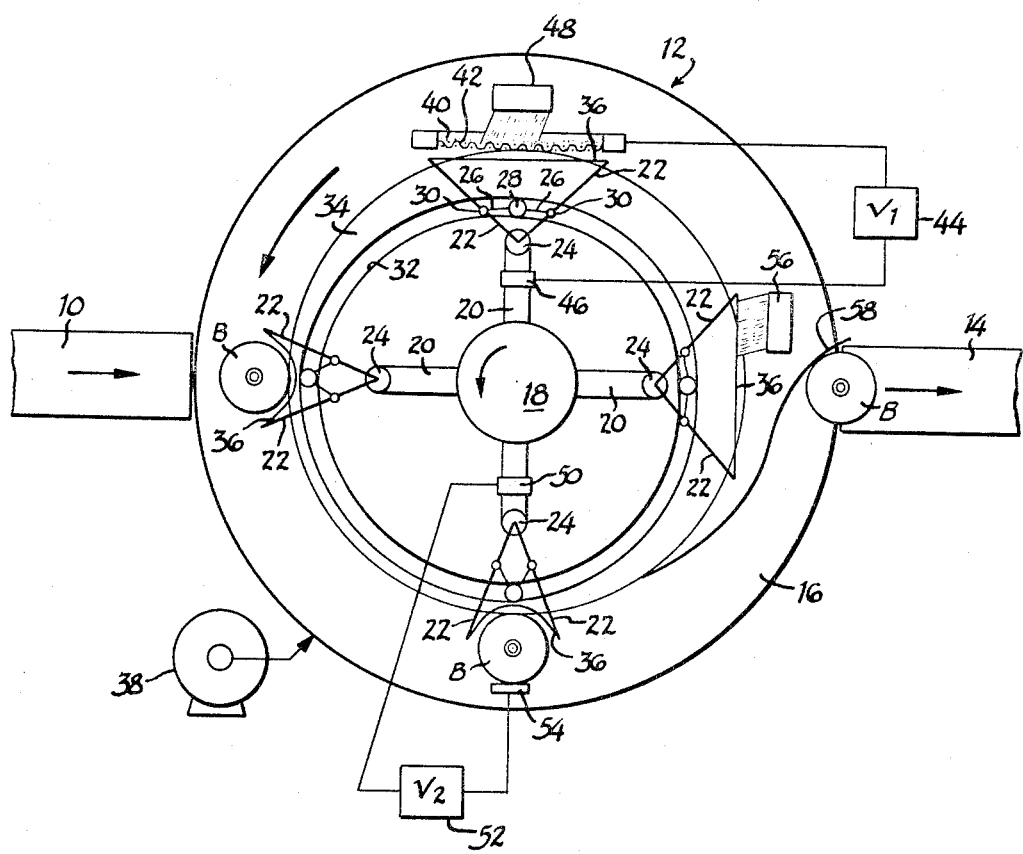

3,276,358
METHOD AND APPARATUS INCLUDING FLEXIBLE CONDUCTIVE OFFSET MEMBER FOR DECORATING ARTICLES
Kenneth G. Lusher, Perrysburg, Ohio, assignor to Owens-Illinois, Inc., a corporation of Ohio
Filed Apr. 1, 1964, Ser. No. 356,626
8 Claims. (Cl. 101—129)

This invention relates to methods and apparatus for decorating articles by a so-called electrostatic process, and more particularly to methods and apparatus for decorating or applying a patterned layer of powder particles to curved article surfaces, such as the sides of glass bottles, tumblers or the like by an offset plate process.

The present invention is particularly well adapted to the decoration of heated glass articles on a production line basis as the articles emerge from the forming machine. Most prior art devices employed for this purpose involve the use of a planar offset plate combined with article handling apparatus which is operable to provide a rolling motion of the article being decorated across the plate surface. In the usual case, the prior art devices require the employment of some mechanism which picks up the article, aligns the article with the plate and then carries the article in rolling motion across the plate. Minor variations in the shape of the article can exert a substantial effect on the decorating process, aside from the expense and complexity of the apparatus required to accurately align, support and roll the object relative to the offset plate.

Accordingly, it is an object of the present invention to provide methods and apparatus for applying a patterned layer of powder particles to curved surfaces of articles which do not require rolling motion between the article and an offset plate.

It is another object of the invention to provide methods and apparatus for decorating curved surfaces of heated glass articles which require a minimum of handling to operatively align the heated article with the offset plate from which the decoration is transferred to the article surface.

Still another object of the invention is to provide methods and apparatus for applying a patterned layer of powder particles to curved surfaces of articles without directly contacting the offset plate either during the step of forming the image on the plate or transferring the image to the surface of the article.

Still another object of the invention is to provide methods and apparatus in accordance with the foregoing objects which are particularly adapted for mass production operation.

In the achievement of the foregoing and other objects, the present invention contemplates the employment of a flexible electrically conductive offset plate which is disposed in a flat planar position for the application of the image to be transferred to the plate. The powder may be applied to the plate, while in its flat position, by brushing printing powder particles through the image apertures of an adjacent stencil screen while applying an electric potential to the plate and electrically charging the particles to attract the particles in straight line motion to the surface of the plate.

After a patterned layer of particles has been applied to the plate, the plate is flexed into a concavely curved configuration conforming generally to the curved surface of the article to which the powder is to be transferred. In the case of a truly cylindrical article, viewed from above, the flexed plate forms a semi-circular pocket of a radius slightly greater than that of the article into which the article can be readily fed. Application of an electric field between the article surface and plate is employed to electrically transfer the powder layer from the plate to the surface of the article.

In an exemplary form of the apparatus, after the transfer of the powder layer to the article surface, the article is withdrawn and the plate is then stretched to its flat position and transferred to a cleaning station where the residue of powder on the surface of the plate is cleaned as by a brush. The plate is then returned to the stencil screen for application of a subsequent image. Suitable apparatus for performing the invention may include a turret intermittently rotated to each of four stations separated from each other by 90°. The powder is applied to the screen at the first station, the article is registered with the curved screen at the second station, the image is transferred at the third station, and the plate is cleaned at the fourth station.

Other objects and features of the invention will become apparent by reference to the following specification and to the drawing.

In the drawings:

FIG. 1 is a schematic diagram in plan view of an exemplary apparatus embodying the invention.

As schematically shown in FIG. 1, one form of apparatus embodying the invention includes a first conveyor 10 which may convey glass articles directly from the forming machine, not shown, to the decorating apparatus embodying the present invention which is designated generally 12. A second or take-out conveyor 14 is employed to transfer decorated articles from the decorating apparatus 12 and may convey these articles to an annealing lehr.

The decorating apparatus 12 includes a turntable 16 and a central turret 18 which are coupled to each other and supported in a suitable manner for rotation about the central axis of the turntable. Four symmetrically disposed support arms 20 are mounted upon and project radially outwardly from turret 18 at positions spaced 90° from each other about the axis of turret rotation.

At the outer end of each arm 20, a pair of plate holder arms 22 are supported for pivotal movement toward and away from each other about a pivot 24. Intermediate the ends of arms 22, each pair of arms is coupled by a twin link assembly which includes two links 26 pivotally connected to each other at a central pivot 28 and connected at their other ends to the respective arms 22 by pivots 30. Pivots 28 are projected downwardly so that their lower ends ride in a cam groove 32 recessed into the surface of a stationary table or platform 34. As the turret and support arms are rotated relative to platform 34, cam groove 32 shifts the link pivots 28 radially inwardly and outwardly from the axis of rotation to position plate holder arms 22 in the spread position shown on the upper and the right hand support arms 20 of FIG. 1, or in their closed position shown on the left hand and lower arms 20 of FIG. 1.

Coupled between the outer ends of each pair of plate holder arms 22 is a flexible metallic offset plate 36. Offset plate 36 is preferably of rectangular configuration fixedly secured along its two shorter sides to the respective plate holder arms 22. The longer sides of the plates 36 are designed with a length such that when the plate holder arms 22 coupled to the plate are in their spread position, the plate 36 is tensioned into a flat planar position, as shown on the upper and right hand support arms 20 of FIG. 1. When the arms 22 are moved toward their closed position, the flexible plate 36 is flexed into a curved configuration of a radius dependent upon the spacing between the outer ends of arms 22. The curvature of the plate 36 when arms 22 are in their closed position is selected to be slightly greater than the radius of curvature of the article being printed, so when the axis of a cylindrical article is concentric with the curvature of the curved plate 36, a slight spacing exists between the surface of the article and the facing surface of the plate 36.

The turntable and turret are driven in intermittent rotation by a suitable drive mechanism schematically illustrated at 38 which rotatably advances the turntable and turret 90° counterclockwise as viewed in FIG. 1 in each rotative step.

When a first arm 20 is located in the upper or 12 o'clock position of the drawings, the plate 36 carried by the support arm is in a flat planar position and is registered in adjacent parallel alignment with a stencil screen 40 having pattern-defining apertures through the screen. The screen 40 is supported in registry with the plate 36 by suitable means, not shown, and a supply of printing powder particles is supported at the outer side of the screen. The powder particles may be colorant frits as described in the copending application of William H. Wood, Ser. No. 242,230, assigned to the assignee of this application.

Screen 40 may be electrically conductive and connected to one terminal of an electric power supply schematically illustrated at 44. The opposite terminal of power supply 44 is connected as by a contact assembly 46 mounted upon stationary platform 34 to be electrically connected to the metallic plate 36 via the support assembly, when the support arm is in the first or 12 o'clock position of FIG. 1. Preferably a brush mechanism schematically illustrated at 48 is employed to brush particles back and forth across the back of stencil screen 40 to express the particles through the image apertures of the screen and the electric field set up by the connections of power supply 44 to plate 40 and the screen electrically attracts the particles to the surface of plate 36 to form a patterned layer of the particles on the surface of the plate.

After the patterned layer of particles has been applied to the plate as described above, intermittent drive 38 is actuated to rotate the turntable and turret 18 90° in a counterclockwise direction as viewed in the drawings into a position where the arm 20 points toward the discharge end of conveyor 10. During this 90° rotation, the radial distance of cam groove 32 from the axis of rotation steadily increases, forcing link pivot 28 radially outwardly to collapse arms 22 to their closed position. The pivoting of the arms 22 inwardly toward each other flexes the plate 36 into a curved configuration shown at its second or 9 o'clock position on the drawings. This curved configuration, as explained above, is related to the curvature of the surface to be printed.

A glass article is fed by conveyor 10 directly from the forming machine onto turntable 16, the direction of movement of the article along the conveyor being aligned with arm 20 so that the article is centered between the arms 22.

The turret and turntable are then rotated another 90° counterclockwise step to bring the arm 20, with the registered bottle, to the third or 6 o'clock position of the drawings at which an electric contact 50 on the surface of platform 34 contacts the arm 20 to connect, via arm 22, the flexed plate 36 to one terminal of a second voltage supply 52. The opposite terminal of supply 52 is connected to brush 54 located to engage the side of the glass article being decorated. The opposite polarity applied to plate 36 and the article being decorated electrically attracts the powder particles from the surface of plate 36 to the surface of the glass article.

During movement of the article and support arm from the second or 9 o'clock position to the third or 6 o'clock position of the drawings, cam groove 32 is at a constant radius from the axis of rotation so that the curvature of plate 36 does not change between these two positions. If necessary, suitable stationary guide rails, not shown, may be mounted above the turntable to adjust the position of the article radially of the turntable during its movement between these two latter positions.

The next 90° step of rotation carries the support arm 20 to its fourth or 3 o'clock position of the drawings, and during this time, the radius of cam groove 32 decreases forcing pivot 28 radially inwardly to spread plate holder arms 22 to their spread position, thereby restoring the flexible plate 36 to its flat planar position. Upon arrival of the arm 20 at the fourth or 3 o'clock position of the drawings, the plate is cleaned to remove any residue of powder by any suitable means such as a schematically illustrated brush apparatus 56.

As the turntable rotates from the third or 6 o'clock position to the fourth or 3 o'clock position, a suitably located guide rail 58 is employed to deflect the now decorated glass article from the turntable onto the surface of conveyor 14 which may be employed to convey the decorated article to an annealing lehr where the article is annealed and simultaneously the particles forming the image are thermally fused to the article surface.

It is believed apparent that upon the next subsequent 90° counterclockwise rotation of the turret, the cleaned plate 36 is advanced into registry with stencil screen 40 for a subsequent application of a powder image.

The method and apparatus described above are particularly advantageous in that the image to be printed is applied to the offset plate while the plate is in a flat position and is subsequently applied to the curved surface of the article without requiring any rolling contact. It has been found of greater convenience to apply the image to a flat surface rather than a concavely curved surface as would otherwise be required in the absence of the flexible plate.

In the case of glass articles, the articles may be conveniently fed directly from the forming machine to the decorating apparatus while the residual temperature of the article from the forming operation is high enough so that it remains preferably over 500° F. throughout the decorating process. Although the above operation has been described in connection with the decoration of cylindrical surfaces, it is equally well adapted to decoration of conical surfaces by suitable modification of the plate shape and holder arrangement.

While one embodiment of the invention has been described above, it will be apparent to those skilled in the art that the disclosed embodiment may be modified. Therefore, the foregoing description is to be considered exemplary rather than limiting, and the true scope of the invention is that defined in the following claims.

I claim:

1. The method of applying a patterned layer of powder particles to a curved surface of an article comprising the steps of holding a flexible electrically conductive offset plate in a flat planar position, positioning a stencil screen having pattern-defining apertures therethrough in adjacent parallel relationship to the plate in said planar position, passing powder particles through the apertures of said screen to form a patterned layer of particles on said plate while said plate is in said planar position, separating the plate from the screen and flexing the plate with the patterned layer of particles thereon into a curved configuration generally conforming to the curved surface to be decorated, placing the curved surface to be decorated in adjacent spaced relationship to the curved plate, and applying an electric potential to the plate and registered article to electrically transfer the particles from the plate to the surface of the article.

2. The method of applying a patterned layer of powder particles capable of being electrically charged to a curved surface of an article by an electrostatic offset process comprising the steps of holding a flexible electrically conductive offset plate in a flat planar position, positioning a stencil screen having pattern-defining apertures therethrough in adjacent parallel relationship to the plate in said planar position, electrically attracting electrically charged powder particles through the apertures of said screen to the surface of said plate to form a patterned layer of particles on said plate while said plate is in said planar position, separating the plate from the screen and flexing the plate with the patterned layer of particles thereon into a curved configuration conforming to the curved surface to be decorated, positioning the curved surface to be decorated in fixed adjacent spaced relationship with the curved plate, and applying an electric potential to the plate and adjacent article to electrically transfer the patterned layer of particles from the plate to the surface of the article.

3. The method of applying a patterned layer of powder particles to a curved surface of a glass article by an electrostatic offset process comprising the steps of holding a flexible electrically conductive offset plate in a flat planar position, positioning a stencil screen having pattern-defining apertures therethrough in adjacent parallel planar relationship to the plate in said planar position, electrically charging a supply of powder particles at the side of said screen opposite said plate and applying an electric potential to said plate to electrically attract the charged particles through the apertures of said screen to form a patterned layer of particles on said plate while said plate is in said planar position, separating the plate from the screen and flexing the plate with the patterned layer of particles thereon into a curved configuration conforming to the curved surface to be decorated, heating a glass article to be decorated to a temperature above 500° F., placing the heated curved surface to be decorated in adjacent spaced relationship to the curved plate, and applying an electric potential to the plate and adjacent article while the temperature of the article is still above 500° F. to electrically transfer the particles from the plate to the surface of the article.

4. The method of decorating a convexly curved surface of an article by an electrostatic offset process comprising the steps of locating a flexible electrically conductive offset plate in a flat planar position at a first station, registering a stencil screen having image-defining apertures therethrough in adjacent parallel relationship to the plate at said first station, passing printing powder particles through the image apertures of said screen to form an image-shaped layer of particles on said plate while said plate is at said first station, advancing said plate to a second station spaced from said first station, flexing said plate at said second station into a concave curved configuration conforming tdo the curvature of the surface to be decorated, advancing an article to be decorated into adjacent spaced relationship with the curved plate at said second station and applying an electric potential to the article and plate to electrically transfer the powder particles from the plate to the curved surface of the article, withdrawing the article from the curved plate after the transfer of powder particles to the surface of the article while simultaneously advancing the plate to a third station, flexing said plate from said curved configuration to a planar position and holding said plate in said planar position at said third station, cleaning the residue of powder particles from said plate at said third station, and returning said plate to said first station while in said planar position.

5. The method of decorating a curved surface of an article by an electrostatic offset process comprising the steps of locating a flexible electrically conductive offset plate in a flat planar position at a first station, registering a stencil screen having image-defining apertures therethrough in adjacent parallel relationship to the plate at said first station, positioning a supply of printing powder particles at the side of said screen remote from said plate, electrically charging said particles and said plate to electrically attract the particles through the image apertures of said screen to the surface of said plate to form an image-shaped layer of particles on said plate while said plate is at said first station, advancing said plate to a second station spaced from said first station, flexing said plate at said second station into a curved configuration conforming to the curvature of the surface to be decorated advancing an article to be decorated into adjacent spaced relationship with the curved plate at said second station, applying an electric potential to the article and plate to electrically transfer the powder particles from the plate to the curved surface of the article, withdrawing the article from the curved plate after the transfer of powder particles to the surface of the article while simultaneously advancing the plate to a third station, flexing said plate from said curved configuration to a planar position and holding said plate in said planar position at said third station, cleaning the residue of powder particles from said plate at said third station, and returning said plate to said first station while in said planar position.

6. Apparatus for applying a patterned layer of powder particles to a curved surface of a glass article or the like comprising a flexible electrically conductive offset plate, support means supporting said plate and actuatable to flex said plate into a flat planar position or into a concavely curved position generally conforming to the curved surface to be decorated, means for applying a patterned layer of powder particles to said plate when said plate is in said planar position, means for placing the curved surface of an article to be decorated in adjacent spaced relationship with the layer of powder on said plate when said plate is in said curved position, and means for establishing an electric field between the plate and article to electrically attract the patterned layer of powder particles from the plate to the article surface.

7. Apparatus for applying a patterned layer of powder particles to a curved surface of a glass article or the like comprising a flexible electrically conductive plate, support means supporting said plate for movement along a path between a first position on said path and a second position on said path, means operable when said support means is at said first position to flex said plate into a flat planar position and operable when said support means is at said second position to flex said plate into a concavely curved position conforming generally to the curved surface to be decorated, means for applying a patterned layer of powder particles to said plate when said plate is at said first position, means for moving said plate from said first position to said second position after the application of the patterned layer of powder to said plate, means for placing the curved surface of an article to be decorated in adjacent spaced relationship with the patterned layer of powder on said plate when said plate is in said curved position at said second position, and means for establishing an electric field between the plate and article to electrically attract the patterned layer of powder from the curved surface of the plate to the curved surface of the article.

8. Apparatus for decorating curved surfaces of glass articles or the like comprising a flexible electrically conductive plate, means for moving said plate along an endless flat path to each of four successive positions on said path, plate flexing means for locating and maintaining said plate in a flat planar position at and during movement between a fourth and a first of said positions on said path and for locating and maintaining said plate in a concavely curved flexed position conforming generally to the curved surface of an article to be decorated while said plate is at or between a second and a third of said positions on said path, means operable when a plate is at said first position for applying an image-shaped layer of printing powder particles to said plate, first conveying means for feeding an article to be decorated into adjacent spaced relationship with a curved plate when the plate is at said second position, second conveying means for maintaining the article in said adjacent spaced relationship with the curved plate as said plate is moved from said second position to said third position, means operable to establish an electric field between the adjacent spaced plate and article when the plate is at said third position to electrically attract the powder from the curved plate to the curved article surface, third conveying means for conducting the decorated article out of said adjacent spaced relationship with said plate during movement of said plate between said third position and said fourth position, and means at said fourth position for cleaning and residue of powder from the surface of said plate.

References Cited by the Examiner

UNITED STATES PATENTS

| | | | |
|---|---|---|---|
| 1,326,843 | 12/1919 | Brewer | 101—426 |
| 2,202,762 | 5/1940 | Freed | 101—44 |
| 2,347,022 | 4/1944 | Austin | 101—129 |
| 2,612,106 | 9/1952 | Ryckman | 101—44 X |
| 2,904,916 | 9/1959 | Stahmann | 101—129 X |
| 3,081,698 | 3/1963 | Childress et al. | 101—114 X |

FOREIGN PATENTS 737,461  9/1955  Great Britain.

OTHER REFERENCES

Article by C. D. Oughton in "The Glass Industry," December 1949, pp. 662–664 and 684 entitled: "Decoration of Glass and Ceramic Articles by Xerography."

Article in "Modern Packaging," January 1963, pp. 115–118, 164 and 166 entitled: "Electrostatic Printing."

ROBERT E. PULFREY, *Primary Examiner.*

E. S. BURR, *Assistant Examiner.*